(12) United States Patent
Li

(10) Patent No.: US 8,531,994 B2
(45) Date of Patent: Sep. 10, 2013

(54) AUDIO PROCESSING METHOD, SYSTEM, AND CONTROL SERVER

(75) Inventor: Yingbin Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 326 days.

(21) Appl. No.: 12/824,892

(22) Filed: Jun. 28, 2010

(65) Prior Publication Data

US 2010/0268541 A1 Oct. 21, 2010

Related U.S. Application Data

(63) Continuation of application No. PCT/CN2008/073694, filed on Dec. 24, 2008.

(30) Foreign Application Priority Data

Dec. 28, 2007 (CN) .......................... 2007 1 0305684

(51) Int. Cl.
*H04L 12/18* (2006.01)
(52) U.S. Cl.
USPC ........................................................ 370/262
(58) Field of Classification Search
USPC ................................................ 370/259–269
See application file for complete search history.

(56) References Cited

U.S. PATENT DOCUMENTS

| | | | | |
|---|---|---|---|---|
| 2002/0064136 A1* | 5/2002 | O'Neil | ........................ | 370/267 |
| 2003/0063574 A1* | 4/2003 | Virolainen | ..................... | 370/260 |
| 2003/0088619 A1* | 5/2003 | Boundy | ........................ | 709/204 |
| 2006/0055771 A1 | 3/2006 | Kies | | |
| 2006/0120307 A1 | 6/2006 | Sahashi | | |
| 2007/0064094 A1 | 3/2007 | Potekhin et al. | | |
| 2007/0206089 A1 | 9/2007 | Eshkoli | | |
| 2007/0273755 A1* | 11/2007 | Yang et al. | ................. | 348/14.08 |
| 2008/0075256 A1 | 3/2008 | Firestone | | |
| 2008/0165895 A1 | 7/2008 | Lesser et al. | | |
| 2008/0267282 A1 | 10/2008 | Kalipatnapu | | |

FOREIGN PATENT DOCUMENTS

| | | |
|---|---|---|
| CN | 1510919 A | 7/2004 |
| CN | 1610349 A | 4/2005 |
| CN | 1835579 A | 9/2006 |
| CN | 1885785 A | 12/2006 |

(Continued)

OTHER PUBLICATIONS

Written Opinion of the International Searching Authority issued in corresponding PCT Patent Application No. PCT/CN2008/073694, mailed Apr. 2, 2009.

(Continued)

*Primary Examiner* — Ricky Ngo
*Assistant Examiner* — Wei-Po Kao

(57) ABSTRACT

An audio processing method includes: after the terminal accesses the control server, the control server obtains audio capabilities of the terminal through capability negotiation; and the control server forwards the coded audio data to each terminal according to the audio capabilities. An audio processing system and a control server are disclosed. In the embodiments of the present disclosure, the audio data does not need to undergo an operation of audio coding and decoding every time when the audio data passes through a control server, and the number of coding and decoding operations performed by the control server are reduced drastically. Especially, in the case that only one control server exists, the audio delay between terminals only derives from network transmission, coding of the sending terminal and decoding of the receiving terminal, and the control server extracts and reassembles the packets of the audio data only.

10 Claims, 12 Drawing Sheets

(56) References Cited

FOREIGN PATENT DOCUMENTS

| | | |
|---|---|---|
| CN | 1929593 A | 3/2007 |
| CN | 1937664 A | 3/2007 |
| CN | 1953537 A | 4/2007 |
| EP | 1515570 A1 | 9/2003 |
| EP | 1 672 866 A1 | 6/2006 |
| EP | 1 850 592 A1 | 10/2007 |
| EP | 1850592 A1 | 10/2007 |
| JP | 11261637 A | 9/1999 |
| JP | 2003-023499 | 1/2003 |
| JP | 2006-340376 | 12/2006 |
| KR | 20050084551 A | 8/2005 |
| KR | 20070040850 A | 4/2007 |
| KR | 10-2007-0103051 | 10/2007 |
| WO | WO 03/103271 A1 | 12/2003 |

OTHER PUBLICATIONS

Extended European Search Report issued in corresponding European Patent Application No. 08870951.4, mailed Oct. 29, 2010.

Office Action issued in corresponding Chinese Patent Application No. 200710305684.6, mailed Dec. 24, 2010.

Office Action issued in corresponding Japanese Patent Application No. 2010-540017, mailed Jul. 10, 2012.

Partial Translation of previously cited Chinese Published Application No. 1885785A.

International Search Report issued in corresponding PCT Application No. PCT/CN2008/073694; mailed Apr. 2, 2009.

Office Action issued in corresponding Korean Patent Application No. 10-2010-7014148, mailed Mar. 28, 2012.

Office action issued in corresponding EP application No. 08870951.4, dated Jan. 23, 2013, total 4 pages.

ITU-T H.320:"Series H: Audiovisual and Multimedia Systems Infrastructure of audiovisual services—Systems and terminal equipment for audiovisual services, Narrow-band visual telephone systems and terminal equipment", Mar. 2004, total 34 pages.

ITU-T H.323:"Series H: Audiovisual and Multimedia Systems Infrastructure of audiovisual services—Systems and terminal equipment for audiovisual services, Packet-based multimedia communications systems", Dec. 2009, total 320 pages.

Fang Yawen et al:"Audio and Video Conference System of Exchange 2000 of Microsoft", Sep. 2005, total 4 pages.

Gu Keming et al:"Design of Audio and Video Systems of Digital Intelligence Conference", Audio Engineering, 2002, total 4 pages.

Xu Wei:"Digital Mixing Scheme of Implementing Audio Conference by Using Fixed-Point DSP", May 2000, total 3 pages.

Fan Xing et al:"Fast Real-Time Adaptive Audio Mixing Schemes in Multimedia Conferencing", Journal of Software, vol. 16, No. 1, 2005, total 8 pages.

Second office action issued in corresponding Japanese application No. 2010-540017, dated Nov. 6, 2012, and an English translation thereof, total 5 pages.

Office action issued in corresponding U.S. Appl. No. 13/669,151, dated Feb. 25, 2013, total 19 pages.

Third office action issued in corresponding Japanese application No. 2010540017, dated Mar. 5, 2013, and an English translation thereof, total 4 pages.

Final Rejection issued in corresponding U.S. Appl. No. 13/669,151, dated Jun. 17, 2013, total 44 pages.

* cited by examiner

AUDIO PROCESSING METHOD, SYSTEM, AND CONTROL SERVER

CROSS-REFERENCE TO RELATED APPLICATIONS

This application is a continuation of International Application No. PCT/CN2008/073694, filed on Dec. 24, 2008, which claims priority to Chinese Patent Application No. 200710305684.6, filed on Dec. 28, 2007, both of which are hereby incorporated by reference in their entireties.

FIELD

The present disclosure relates to voice communication technologies, and in particular, to an audio processing method, an audio processing system, and a control server.

BACKGROUND

Currently, videoconference products or some of the conference call products are primarily compliant with ITU-H.323 or ITU-H.320 for audio processing. The device that implements core audio switching and controls multiple conference terminals is Multipoint Control Unit (MCU). The MCU provides at least a Multipoint Control (MC) function and a Multipoint Processing (MP) function, and can perform audio mixing of multiple audio data. For example, in a conference call, the terminals of at least three sites communicate through the MCU simultaneously. Therefore, the MCU needs to mix the sounds sent by all the terminals into one channel, and send it to the terminal of each site. In this way, it is ensured that the terminal users of all sites communicate like in the same conference room although they are in different spaces.

Taking conference audio processing as an example, the audio processing process for audio communication performed by multiple terminals in the prior art is shown in FIG. 1:

Step 101: On the MCU, audio codec ports are allocated to the terminals that access each site respectively.

Step 102: After the call is initiated, each terminal sends the coded audio data to the MCU respectively.

Step 103: The MCU decodes the audio data sent by each terminal, and selects the audio data of the site which produces a larger volume of sound.

Step 104: The selected audio data is mixed into one channel of audio data.

Step 105: The mixed channel of audio data is encoded and then sent to each site terminal.

Step 106: The terminals on each site decode the received audio data.

In the prior art, an audio coding and decoding process needs to be performed once the audio data passes through the MCU after the terminal on each site sends audio data to the MCU until each site receives the mixed channel of audio data sent by the MCU.

The inventor finds at least these problems in the prior art: Once a coding and decoding process occurs, the audio distortion from terminal to terminal increases. When a multi-point conference based on an MCU begins, the terminal on the site needs to perform a coding process and a decoding process; on the occasion of MCU audio mixing, another coding and decoding process needs to be performed, so that the audio is distorted twice. When a multi-point conference based on two cascaded MCUs begins, the terminal on the site needs to perform a coding and decoding process; on the occasion of audio mixing by the two MCUs, two coding and decoding processes need to be performed, so that the audio is distorted three times. By analogy, once an MCU is added, the audio is distorted for one more time. Moreover, like the deducing of audio distortion above, it is easy to know that every process of coding and decoding increases the audio delay from terminal to terminal. Besides, for the site terminals that join a voice conference simultaneously, the MCU needs to allocate an audio codec port to each terminal. Especially, when there are many sites, the MCU needs to provide plenty of audio codec ports, which increases the cost of the multi-point conference.

SUMMARY

The embodiments of the present disclosure provide an audio processing method, an audio processing system, and a control server.

An audio processing method includes: receiving, by a control server, coded audio data sent by each terminal that accesses the control server; performing capability negotiation with each terminal to obtain audio capabilities of each terminal; and forwarding audio data extracted from the coded audio data to each terminal according to the audio capabilities.

An audio processing system includes at least one control server and multiple terminals. The control server is configured to: receive coded audio data sent by each terminal that accesses the control server, perform capability negotiation with each terminal to obtain audio capabilities of each terminal, and forward audio data extracted from the coded audio data to each terminal according to the audio capabilities; and The terminal is configured to: access the control server, decode the received audio data, mix the audio data automatically, and play them.

A control server includes: an obtaining unit, configured to: receive coded audio data sent by each terminal that accesses the control server, and perform capability negotiation with each terminal to obtain audio capabilities of each terminal; and a forwarding unit, configured to forward audio data extracted from the coded audio data to each terminal according to the audio capabilities.

In the present disclosure, after the terminal accesses the control server, the control server obtains the audio capabilities of the terminal through capability negotiation, and forwards the coded audio data to each terminal according to the audio capabilities. The audio data does not need to undergo a coding and decoding process every time when the audio data passes through a control server, and the control server reassembles and forwards extracted packets and assembled packets of the audio data only, thus reducing the number of times of coding and decoding, shortening the transmission delay of audio data, enhancing real time of interaction between terminals, making the control server occupy less audio codec resources, and reducing the costs. On the basis of reducing operations of coding and decoding by the control server, multiple audio channels are mixed, and the technical solution under the present disclosure is highly compatible with the control server based on the existing standard protocol, and is widely applicable to communication fields such as videoconference and conference calls.

DETAILED DESCRIPTION OF THE EMBODIMENTS

The embodiments of the present disclosure provide an audio processing method, an audio processing system, and a control server. After the terminal accesses the control server, the control server obtains the audio capabilities of the terminal through capability negotiation, and forwards the coded audio data to each terminal according to the audio capabilities.

In order to make the present disclosure clearer to those skilled in the art, the following describes the present disclosure in more details with reference to accompanying drawings and preferred embodiments.

Figure 1:
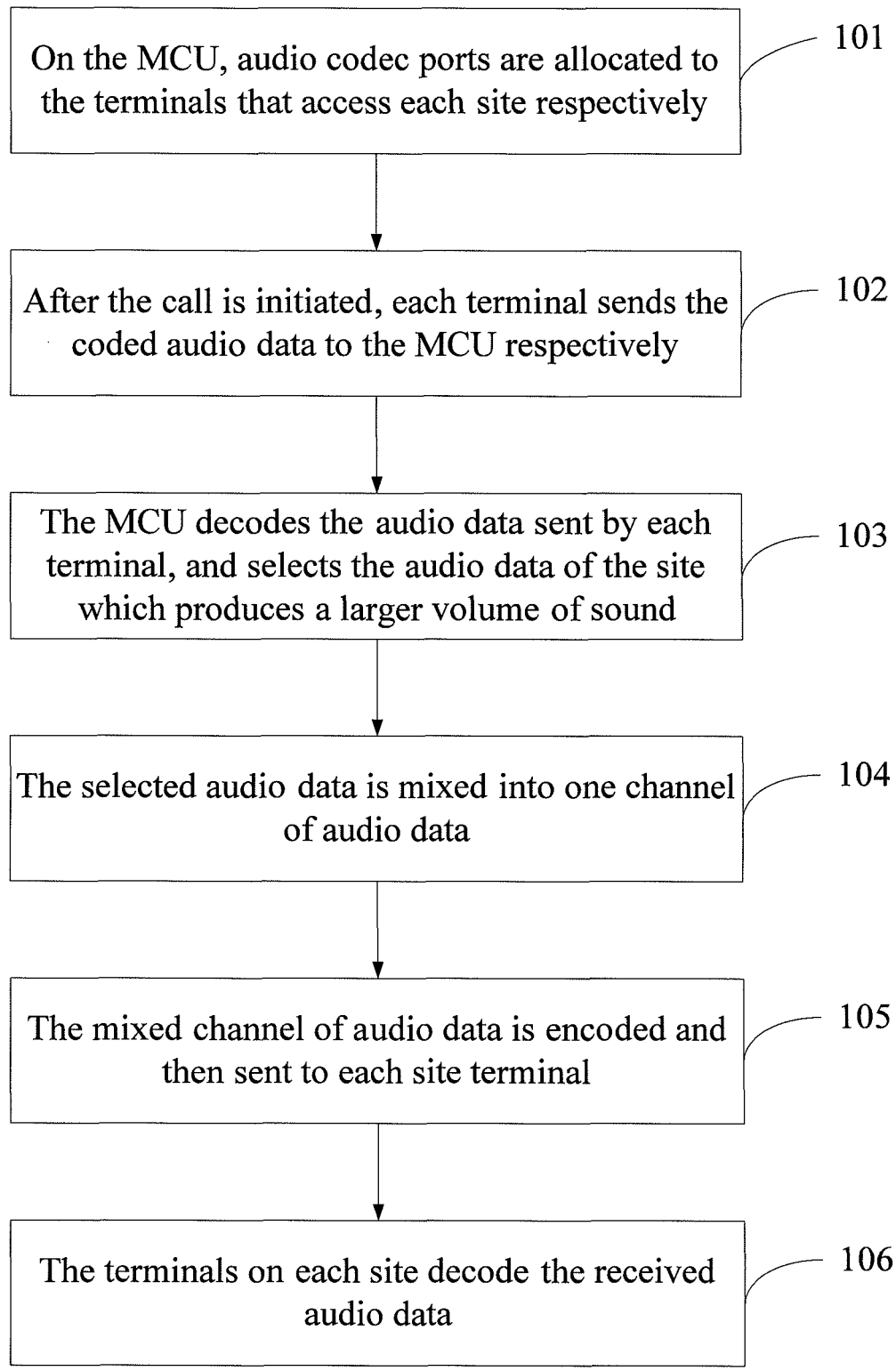
FIG. 1 shows audio processing at time of audio communication between multiple terminals in the prior art.
Figure 2:
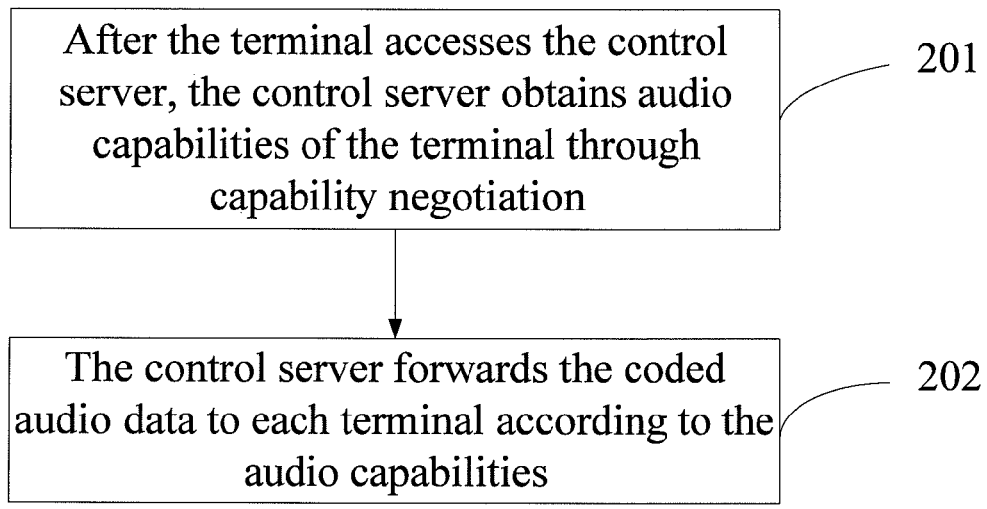
FIG. 2 is a flowchart of an audio processing method in the first embodiment of the present disclosure.

FIG. 2 is a flowchart of an audio processing method in the first embodiment of the present disclosure. The method includes the following steps:

Step 201: After the terminal accesses the control server, the control server obtains audio capabilities of the terminal through capability negotiation.

The audio capabilities of the terminal include: The terminal supports multi-channel separation audio codec protocols, or the terminal supports multiple audio logical channels, or the terminal does not support multi-channel separation audio codec protocols or multiple audio logical channels.

Step 202: The MCU forwards the coded audio data to each terminal according to the audio capabilities.

The control server uses any of the following modes to forward the coded audio data to each terminal according to the audio capabilities: If the terminal supports multi-channel separation audio codec protocols, the control server selects multiple channels of the audio data, encapsulates them, and forwards them in one audio logical channel; if the terminal supports multiple audio logical channels, the control server selects multiple channels of the audio data, and forwards them in multiple audio logical channels. If the terminal does not support the foregoing mode, the conference server performs audio-mixed coding for the audio data, and sends the data to each terminal.

In the case that only one control server exists, the control server forwards the coded audio data to each terminal that accesses the control server according to the audio capabilities. In the case that multiple control servers are cascaded, the control servers transmit the data in a cascaded way according to the audio capabilities; the sender-side control server receives the coded audio data sent by each terminal that accesses the sender-side control server, extracts audio data from the coded audio data sent by each terminal and sends the audio data to the receiver-side control server, and the receiver-side control server forwards the audio data to each terminal that accesses the receiver-side control server.

Figure 3:
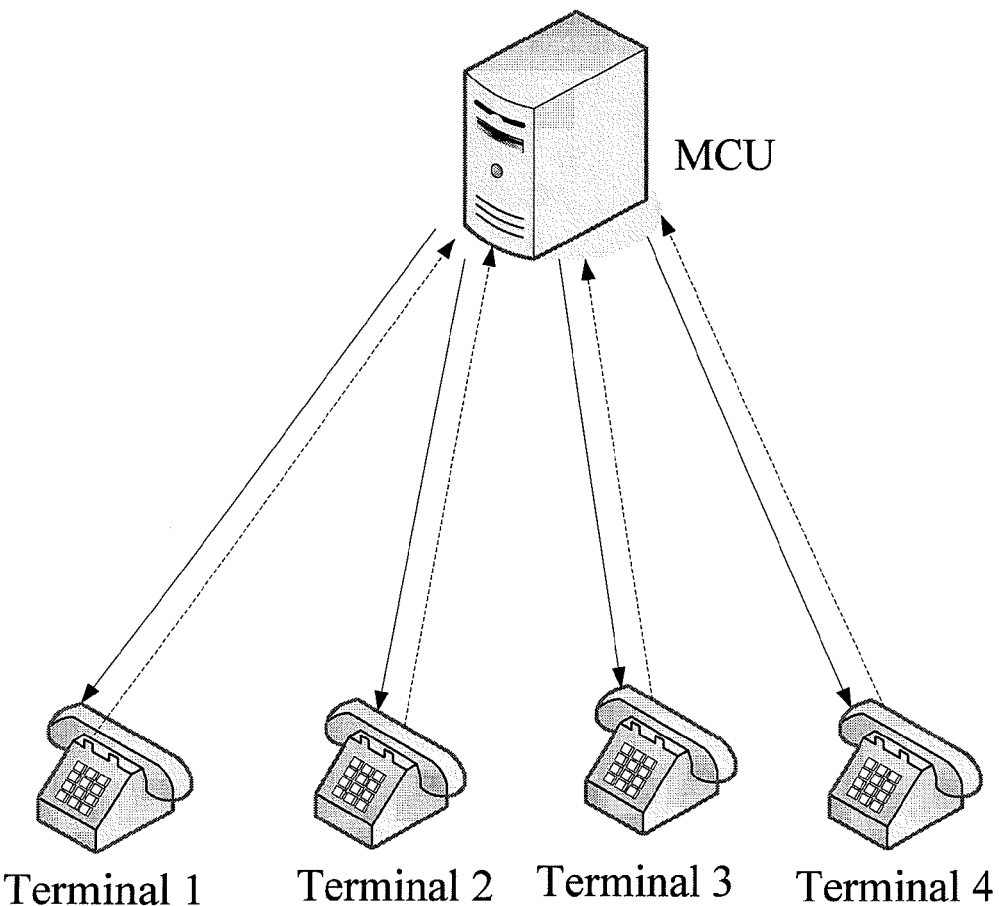
FIG. 3 shows the architecture of an audio processing method in the second embodiment of the present disclosure.
Figure 4:
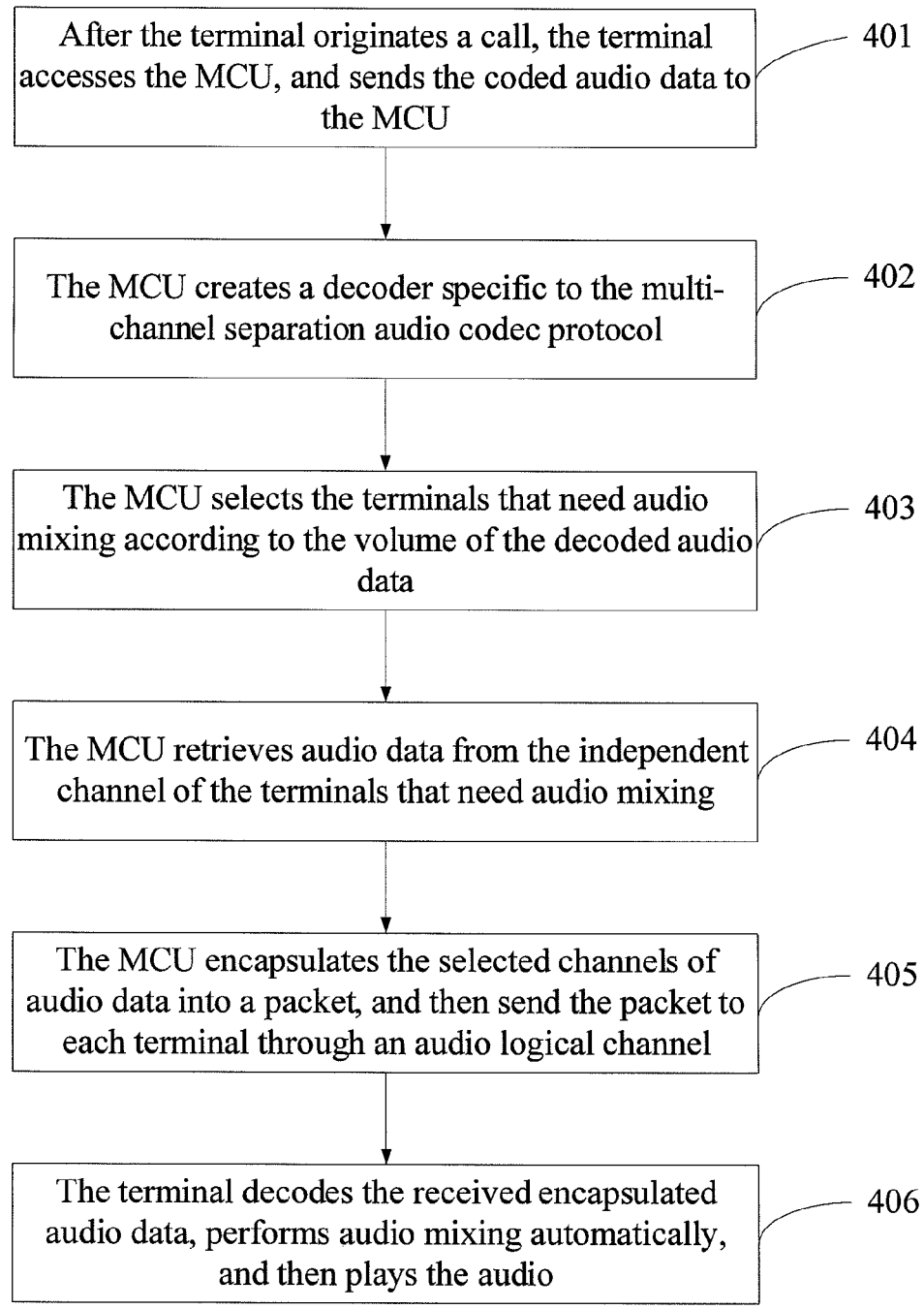
FIG. 4 is a flowchart of an audio processing method in the second embodiment of the present disclosure.

FIG. 3 shows the architecture of an audio processing method in the second embodiment of the present disclosure. The control server in FIG. 3 is an MCU. Four terminals are connected with the MCU to implement multi-point audio processing. A unique audio sending channel (indicated by the solid line arrow in FIG. 3) exists between each terminal and the MCU, and a unique audio receiving channel (indicated by the dotted line arrow in FIG. 3) exists between each terminal and the MCU. That is, an audio logical channel exists between the MCU and the terminal. In light of the architecture shown in FIG. 3, the audio processing method in the second embodiment of the present disclosure is shown in FIG. 4. This embodiment deals with audio data processing between an MCU and a terminal based on a multi-channel separation audio codec protocol.

Step 401: After the terminal originates a call, the terminal accesses the MCU, and sends the coded audio data to the MCU.

When the terminal originates the call, the terminal generally performs capability negotiation with the MCU to determine support of the multi-channel separation audio codec protocol between the terminal and the MCU. This protocol is generally an international standard such as Advanced Audio Coding (AAC), or a private protocol.

Step 402: The MCU creates a decoder specific to the multi-channel separation audio codec protocol.

In the multi-channel separation audio codec protocol in this embodiment, "channel separation" means that the MCU does not need to decode the received audio coded data of each terminal, but knows the channel from which the audio data comes and the audio coding protocol of this channel according to the IP packet that carries the audio coded data.

Step 403: The MCU selects the terminals that need audio mixing according to the volume of the decoded audio data.

Step 404: The MCU extracts audio data from the independent channel of the terminals that need audio mixing.

In the embodiments of the present disclosure, the MCU does not need to decode the received audio data of all terminals uniformly, select the several required channels of audio data for audio mixing, or encode the data, but directly extracts one channel of audio packets from the received audio data of the multi-channel separation audio codec protocol. The terminal corresponding to the extracted audio packets is the terminal selected for audio fixing according to the volume of the audio data.

Step 405: The MCU encapsulates the selected channels of audio data into a packet, and then sends the packet to each terminal through an audio logical channel.

The several extracted channels of audio packets that are not decoded are encapsulated again and assembled together. The terminals that perform multi-point communication with the MCU are terminal 1, terminal 2, terminal 3, and terminal 4. It is assumed that the three channels of audio data selected according to the volume are the coded audio data sent by terminal 1, terminal 2, and terminal 3. The audio data of each of the three terminals is encapsulated as an independent channel and put into an audio logical channel, namely, the audio data in this logical channel includes the data of the three independent channels, and then the data is forwarded to each terminal. That is, terminal 1 receives the audio data packets composed of the audio coded data of terminal 2 and terminal 3; terminal 2 receives the audio data packets composed of the audio coded data of terminal 1 and terminal 3; terminal 3 receives the audio data packets composed of the audio coded data of terminal 1 and terminal 2; and terminal 4 receives the audio data packets composed of the audio coded data of terminal 1, terminal 2 and terminal 3.

Step 406: The terminal decodes the received encapsulated audio data, performs audio mixing automatically, and then plays the audio.

In the second embodiment of the method under the present disclosure, if not all terminals support the multi-channel separation audio codec protocol for interworking with the MCU, the MCU needs to create resources for audio mixing and coding for the terminals that do not support this protocol, and needs to support automatic audio protocol adaptation. That is, the MCU performs decoding and audio-mixed coding for the audio data sent by the terminal that supports the multi-channel separation audio codec protocol, and sends them to the terminals that do not support this protocol to keep compatibility with the terminals that do not support this protocol.

Figure 5:
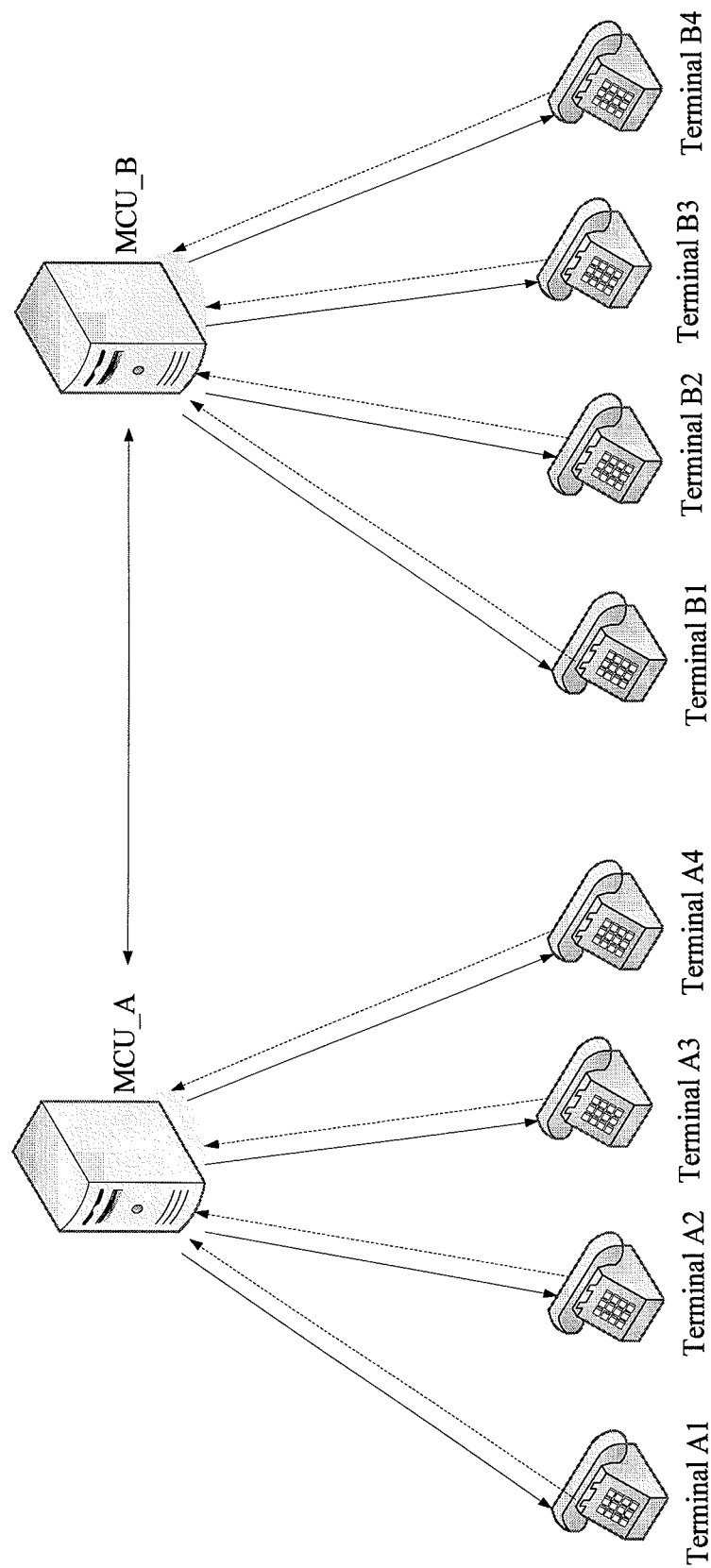
FIG. 5 shows the architecture of an audio processing method in the third embodiment of the present disclosure.
Figure 6:
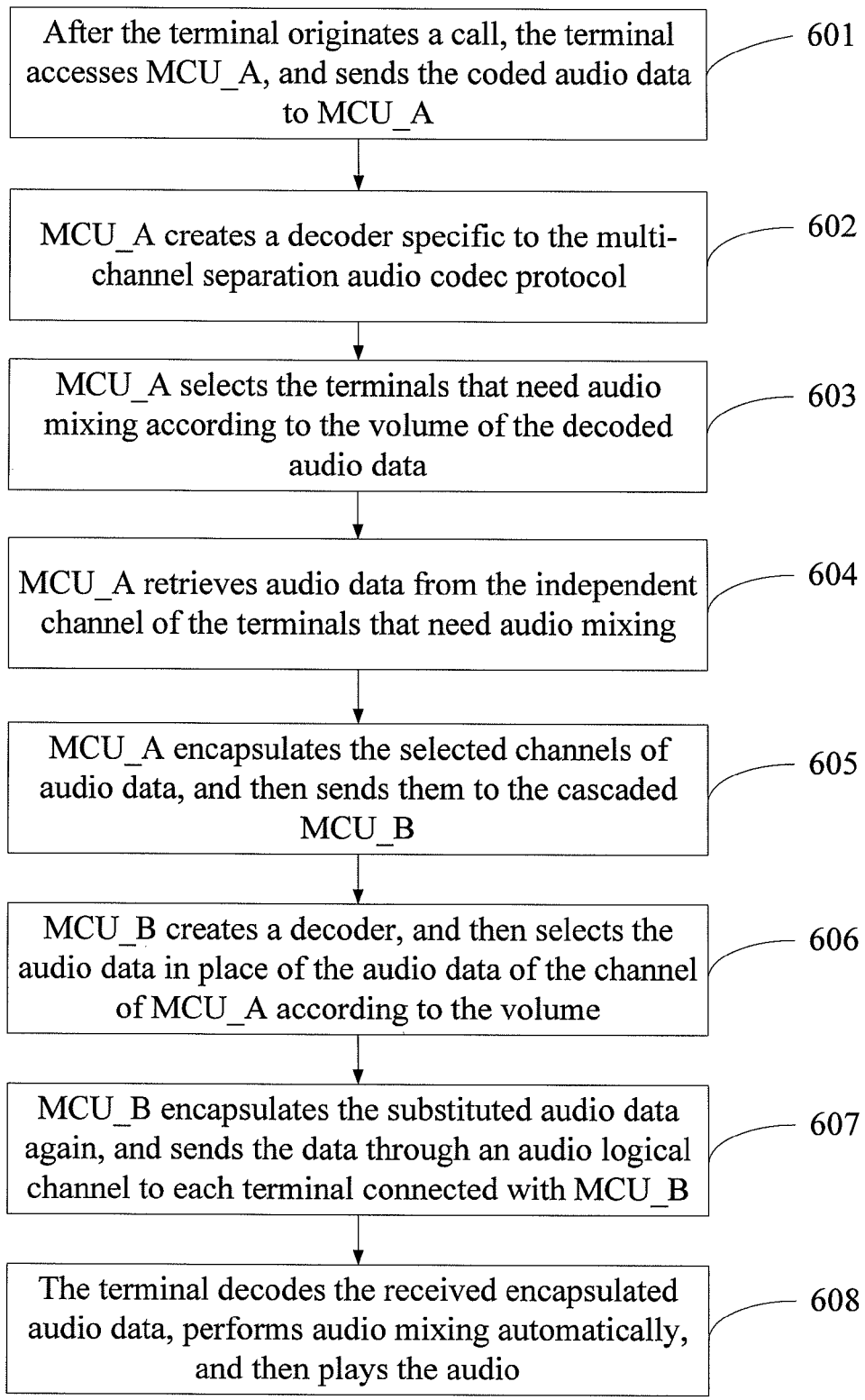
FIG. 6 is a flowchart of an audio processing method in the third embodiment of the present disclosure.

FIG. 5 shows the architecture of an audio processing method in the third embodiment of the present disclosure. In FIG. 5, the control server is the MCU; terminal A1, terminal A2, terminal A3, and terminal A4 are connected with MCU_A respectively; and terminal B1, terminal B2, terminal B3, and terminal B4 are connected with MCU_B respectively. The foregoing terminals implement multi-point audio processing through connection with the MCU. A unique audio sending channel (indicated by the unidirectional solid line arrow in FIG. 5) exists between each terminal and the MCU, and a unique audio receiving channel (indicated by the dotted line arrow in FIG. 5) exists between each terminal and the MCU. That is, one audio logical channel exists between the MCU and the terminal, and one channel of call is implemented between the MCUs (indicated by the bidirectional solid line arrow in FIG. 5). In light of the architecture shown in FIG. 5, the audio processing method in the third embodiment of the present disclosure is shown in FIG. 6. This embodiment deals with audio data processing between each of two cascaded MCUs and a terminal based on a multi-channel separation audio codec protocol.

Step 601: After the terminal originates a call, the terminal accesses MCU_A, and sends the coded audio data to MCU_A.

Step 602: MCU_A creates a decoder specific to the multi-channel separation audio codec protocol.

Step 603: MCU_A selects the terminals that need audio mixing according to the volume of the decoded audio data.

Step 604: MCU_A extracts audio data from the independent channel of the terminals that need audio mixing.

Step 605: MCU_A encapsulates the selected channels of audio data, and then sends them to the cascaded MCU_B.

Step 606: MCU_B creates a decoder, and then selects the audio data in place of the audio data of the channel of MCU_A according to the volume.

When the cascaded MCU_A and MCU_B handle the audio data sent by the terminal connected to them, the processing method is the same as the processing in the second embodiment of the present disclosure except that one channel is added between MCU_A and MCU_B. Especially, when more than two MCUs are cascaded, more channels are added. Therefore, when the cascaded MCU_A sends the encapsulated audio data to MCU_B, MCU_B compares the volume of the received audio data with the volume of the audio data sent by the terminal connected with MCU_B, and, according to the comparison result, substitutes the audio data of the terminal connected with MCU_B for the audio data of a smaller volume in the audio packet sent by MCU_A.

As shown in FIG. 5, it is assumed that the audio packets selected among terminal A1, terminal A2, terminal A3, and terminal A4 which are connected with MCU_A include the audio data of terminal A1, terminal A2, and terminal A3. After receiving the audio packet, MCU_B compares the volume of the audio packet. If the volume of the audio data of terminal B1 connected with MCU_B is greater than the volume of the audio data of terminal A1, MCU_B substitutes the audio data of terminal B1 for the audio data of terminal A1 in the audio packet.

Step 607: MCU_B encapsulates the substituted audio data again, and sends the data through an audio logical channel to each terminal connected with MCU_B.

Step 608: The terminal decodes the received encapsulated audio data, performs audio mixing automatically, and then plays the audio.

In the third embodiment of the present disclosure, when all terminals support the multi-channel separation audio codec protocol, the MCU on the sender side creates an audio coder for the terminal on the sender side, and the MCU on the receiver side creates an audio decoder for the terminal on the receiver side. Therefore, regardless of the number of MCUs cascaded, it is necessary only to encode data on the terminal of the MCU on the sender side and decode data on the terminal of the MCU on the receiver side. The whole audio processing process involves only one operation of audio coding and decoding. The terminal of the MCU on the sender side sends the audio coded data. After the MCU on the sender side encapsulates the audio data into an audio packet, the audio packet is transmitted between multiple MCUs cascaded. When the packet is transmitted to the MCU on the receiver side, the MCU on the receiver side does not need to decode the packet, but extracts audio data of one channel out of the audio packet directly accordingly to the multi-channel separation audio codec protocol. The MCU on the receiver side substitutes the audio data sent by the terminal of a greater volume of the MCU on the receiver side for the corresponding audio data and sends the data to the terminal of the MCU on the receiver side, and the terminal of the MCU on the receiver side decodes the substituted audio packet.

In the case that not all terminals support the multi-channel separation audio codec protocol, the MCU on the sender side does not need to create an audio coder for the terminal on the sender side, but the MCU on the receiver side creates an audio coder and a decoder for the terminal on the receiver side. Moreover, the MCU on the receiver side needs to decode the received audio packets that are transmitted in a cascaded way, replace the packets, and encode the packets again to accomplish compatibility between terminals. Therefore, regardless of the number of MCUs cascaded, the audio packets do not need to undergo any coding or decoding operation while the audio packets are transmitted between the MCUs except the MCU on the receiver side. Therefore, the whole audio processing process of cascaded transmission involves only two coding and decoding operations. That is, the terminal of the MCU on the sender side sends the audio coded data, the MCU on the sender side encapsulates the audio coded data into an audio packet, and then the audio packet is transmitted between multiple MCUs in a cascaded way. When the packet is transmitted to the MCU on the receiver side, because the multi-channel separation audio codec protocol is not supported, the MCU on the receiver side needs to decode the audio packet, and substitute the audio data of a greater volume from the terminal of the MCU on the receiver side for the audio data of a smaller volume in the audio packet. The MCU on the receiver side encodes the substituted audio data again, and sends the data to the terminal of the MCU on the receiver side. The terminal of the MCU on the receiver side receives the audio packet and decodes it.

Figure 7:
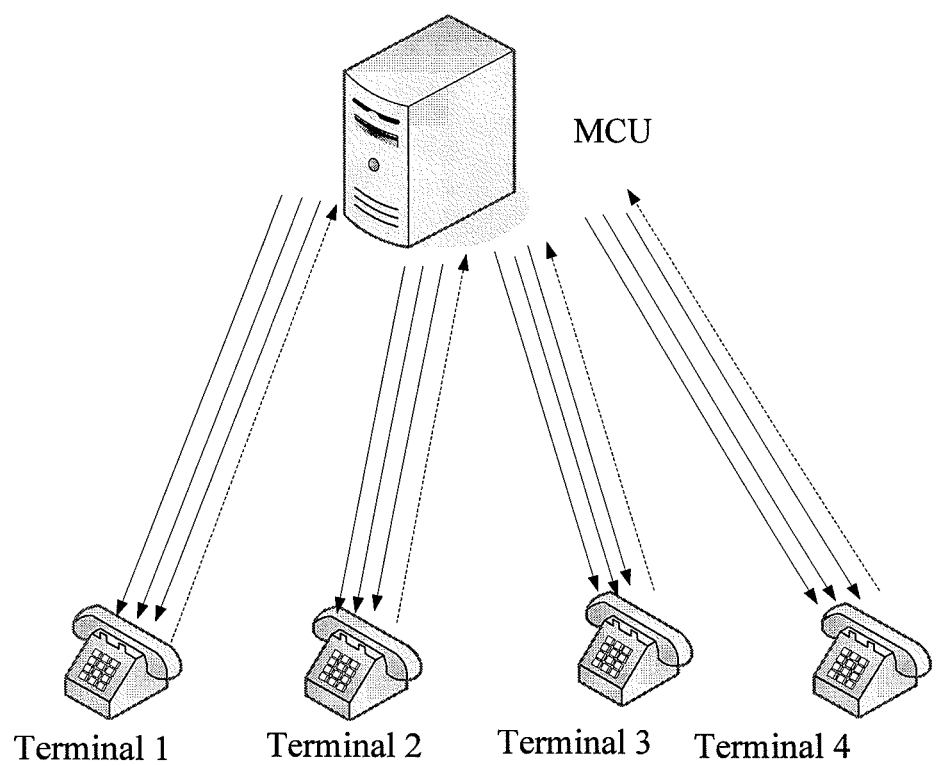
FIG. 7 shows the architecture of an audio processing method in the fourth embodiment of the present disclosure.
Figure 8:
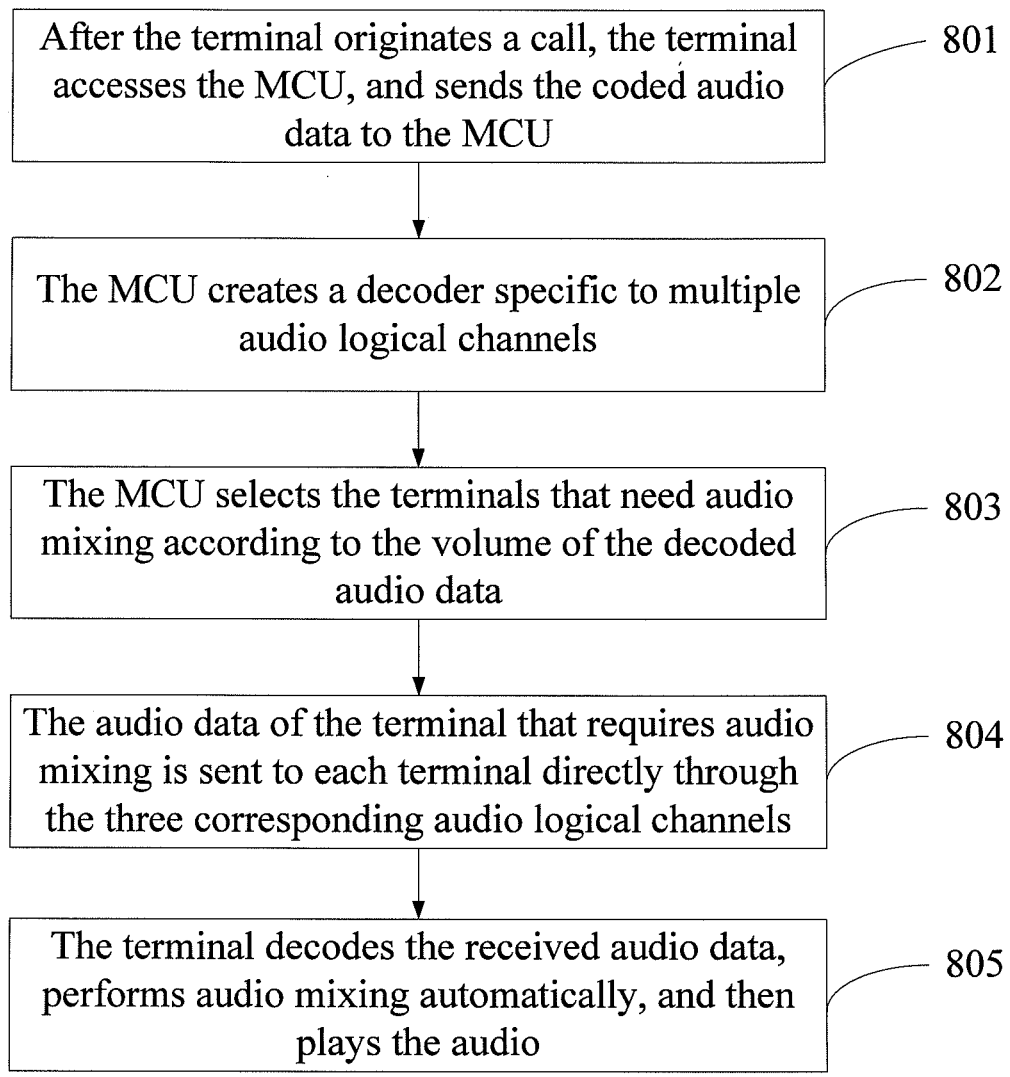
FIG. 8 is a flowchart of an audio processing method in the fourth embodiment of the present disclosure.

FIG. 7 shows the architecture of an audio processing method in the fourth embodiment of the present disclosure. The control server in FIG. 7 is an MCU. Four terminals are connected with the MCU to implement multi-point audio processing. Three audio sending channels (indicated by the solid line arrow in FIG. 7) exist between each terminal and the MCU, and one audio receiving channel (indicated by the dotted line arrow in FIG. 7) exists between each terminal and the MCU. That is, three audio logical channels exist between the MCU and the terminal. This embodiment is based on the international standard protocol that supports audio communication such as H.323. This protocol supports opening of multiple logical channels, and supports multiple logical channels that bear the same type of media. In light of the architecture shown in FIG. 7, the audio processing method in the fourth embodiment of the present disclosure is shown in FIG. 8. This embodiment deals with audio data processing between an MCU and a terminal that has multiple audio logical channels.

Step 801: After the terminal originates a call, the terminal accesses the MCU, and sends the coded audio data to the MCU.

When the terminal originates a call, the terminal generally performs capability negotiation with the MCU to determine support of multiple audio logical channels between the terminal and the MCU. Because the capability negotiation standard protocol carries a non-standard capability protocol field, the capability of supporting multiple audio logical channels is described through this non-standard capability protocol field. It is assumed that a 4-byte content "0x0a0a" exists in the extended capability field of the capability negotiation standard protocol. In the capability negotiation, the MCU finds that "0x0a0a" exists in the non-standard field of the terminal, indicating the capability of supporting multiple audio logical channels. After the call succeeds, the audio processing can be based on the multiple audio channels.

Step 802: The MCU creates a decoder specific to multiple audio logical channels.

Step 803: The MCU selects the terminals that need audio mixing according to the volume of the decoded audio data.

Step 804: The audio data of the terminal that requires audio mixing is sent to each terminal directly through the three corresponding audio logical channels.

For example, after the MCU receives the coded audio data sent by terminal 1, terminal 2, terminal 3, and terminal 4, if the three channels of audio data selected by the MCU according to the audio policy are the audio data of terminal 1, terminal 2, and terminal 3 respectively, the MCU may send the selected audio data in all audio logical channels to each terminal directly. That is, terminal 1 receives audio data of terminal 2 from the audio channel of terminal 2 and receives audio data of terminal 3 from the audio channel of terminal 3; terminal 2 receives audio data of terminal 1 from the audio channel of terminal 1 and receives audio data of terminal 3 from the audio channel of terminal 3; terminal 3 receives audio data of terminal 1 from the audio channel of terminal 1 and receives audio data of terminal 2 from the audio channel of terminal 2; and terminal 4 receives audio data of terminal 1 from the audio channel of terminal 1, receives audio data of terminal 2 from the audio channel of terminal 2, and receives audio data of terminal 3 from the audio channel of terminal 3.

Step 805: The terminal decodes the received audio data, performs audio mixing automatically, and then plays the audio.

The terminal in this embodiment supports opening of multiple audio receiving channels, supports simultaneous decoding of multiple channels of audio data, and supports mixing of the decoded multiple channels of audio data and output of them to a loudspeaker. Taking the audio data received by terminal 1 as an example, terminal 1 decodes the two channels of audio data received from the audio channel of terminal 2 and the audio channel of terminal 3, performs audio mixing, and outputs them to the loudspeaker.

In the fourth embodiment of the present disclosure, if not all terminals support multiple audio logical channels for interworking with the MCU, the MCU needs to create resources for audio mixing and coding for the terminals that do not support multiple logical channels, and needs to support automatic audio protocol adaptation. That is, the MCU performs decoding and audio-mixed coding for the audio data sent by the terminal that supports the multiple audio logical channels, and sends them to the terminals that do not support multiple audio logical channels to keep compatibility with the terminals that do not support multiple audio logical channels.

Figure 9:
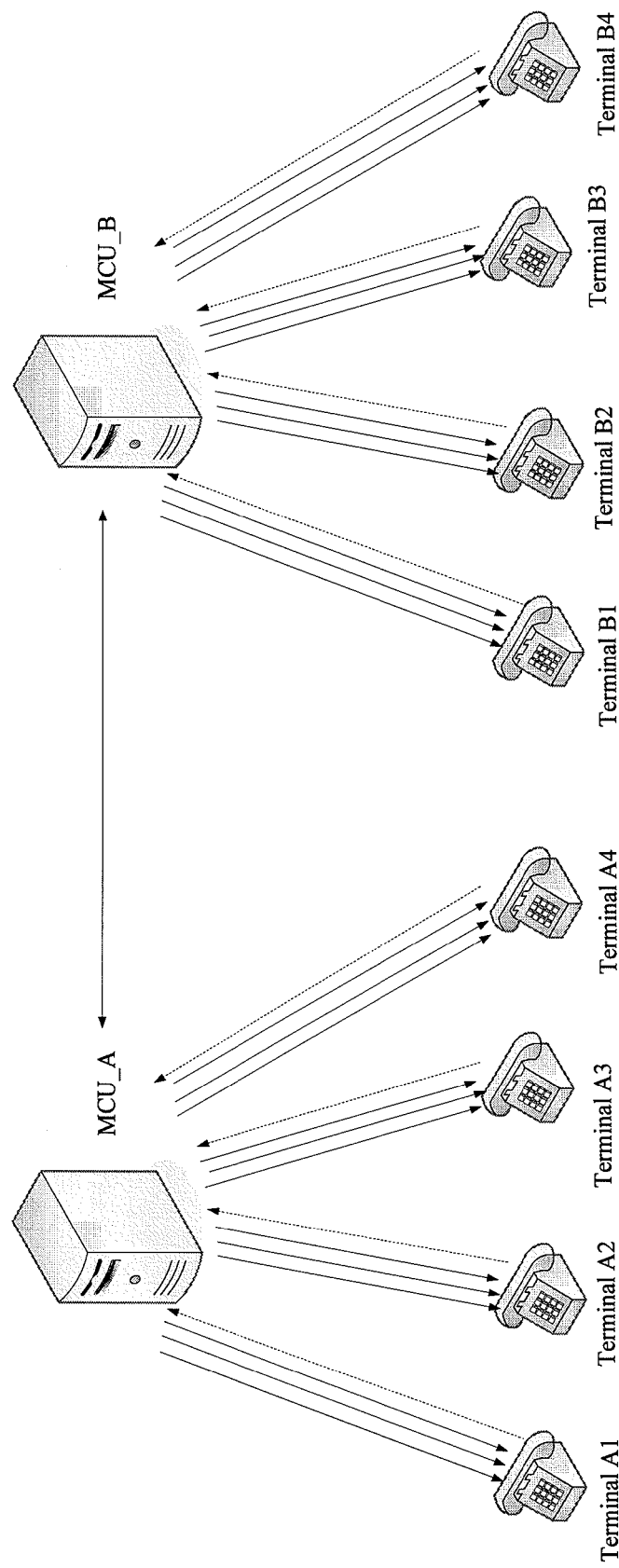
FIG. 9 shows the architecture of an audio processing method in the fifth embodiment of the present disclosure.
Figure 10:
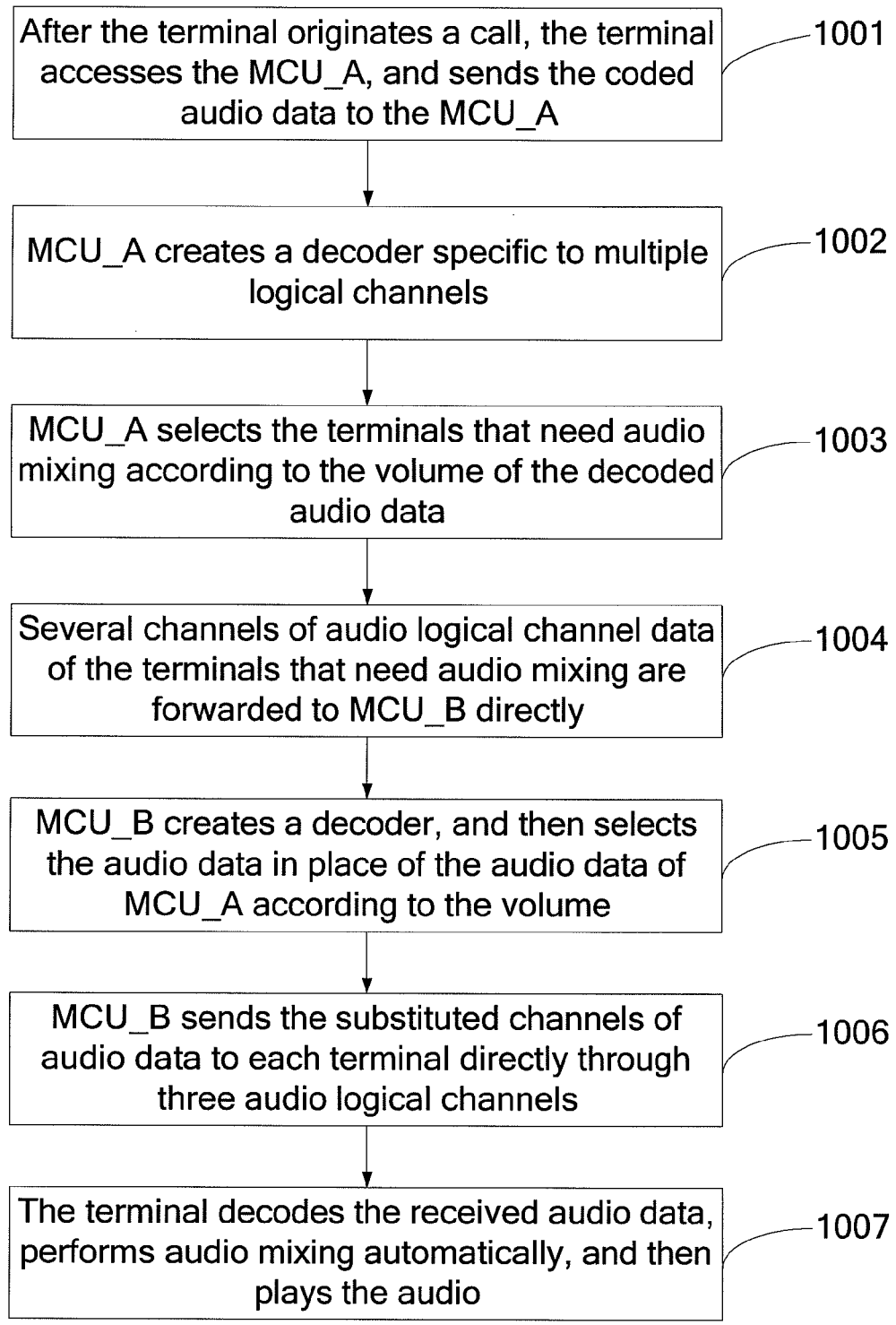
FIG. 10 is a flowchart of an audio processing method in the fifth embodiment of the present disclosure.

FIG. 9 shows the architecture of an audio processing method in the fifth embodiment of the present disclosure. In FIG. 9, the control server is MCU; terminal A1, terminal A2, terminal A3, and terminal A4 are connected with MCU_A respectively; terminal B1, terminal B2, terminal B3, and terminal B4 are connected with MCU_B respectively. The foregoing terminals implement multi-point audio processing through connection with the MCU. Between each terminal and the MCU are three audio sending channels (indicated by the unidirectional solid line arrow in FIG. 9) and one audio receiving channel (indicated by the dotted line arrow in FIG. 9). FIG. 9 shows that four logical channels exist between each terminal and the MCU, and one channel of call is implemented between the MCUs (indicated by the bidirectional solid line arrow in FIG. 9). In light of the architecture shown in FIG. 9, the audio processing method in the fifth embodiment of the present disclosure is shown in FIG. 10. This embodiment deals with audio data processing between each of two cascaded MCUs and a terminal that has multiple audio logical channels.

Step 1001: After the terminal originates a call, the terminal accesses MCU_A, and sends the coded audio data to MCU_A.

When the terminal originates a call, the terminal generally performs capability negotiation with the MCU to determine support of multiple cascaded channels of calls between the terminal and the cascaded MCU. Because the capability negotiation standard protocol carries a non-standard capability protocol field, the capability of supporting multiple cascaded channels of calls is described through this non-standard capability protocol field. It is same with the cascaded call between the MCUs. It is assumed that a 4-byte content "0x0a0b" is defined in the extended capability field of the capability negotiation standard protocol. In the capability negotiation, the MCU finds that "0x0a0b" exists in the non-standard capability field of the terminal, indicating the capability of supporting multiple cascaded channels of calls. After the call succeeds, the audio processing can be based on the multiple cascaded channels of calls.

Step 1002: MCU_A creates a decoder specific to multiple logical channels.

Step 1003: MCU_A selects the terminals that need audio mixing according to the volume of the decoded audio data.

Step 1004: Several channels of audio logical channel data of the terminals that need audio mixing are forwarded to MCU_B directly.

Step 1005: MCU_B creates a decoder, and then selects the audio data in place of the audio data of MCU_A according to the volume.

Step 1006: MCU_B sends the substituted channels of audio data to each terminal directly through three audio logical channels.

Step 1007: The terminal decodes the received audio data, performs audio mixing automatically, and then plays the audio.

In the fifth embodiment of the present disclosure, when all terminals support multiple audio logical channels, the MCU on the sender side creates an audio coder for the terminal on the sender side, and the MCU on the receiver side creates an audio decoder for the terminal on the receiver side. Therefore, regardless of the number of MCUs cascaded, it is necessary only to encode data on the terminal of the MCU on the sender side and decode the audio data transmitted from the multiple audio channels on the terminal of the MCU on the receiver side before audio mixing. The whole audio processing process involves only one operation of audio coding and decoding. That is, the terminal of the MCU on the sender side sends the audio coded data. The MCU on the sender side transmits the audio data between multiple MCUs in a cascaded way through multiple audio logical channels. When the audio data is transmitted to the MCU on the receiver side, the MCU on the receiver side does not need to decode the data, but replaces the audio data of multiple logical channels with the audio data of the audio logical channel which is sent by the terminal of a greater volume of the MCU on the receiver side according to the capability of multiple audio logical channels, and then sends the data to the terminal of the MCU on the receiver side. The terminal of the MCU on the receiver side decodes the multiple channels of audio data transmitted through the multiple audio logical channels after the replacement.

In the case that not all terminals support multiple audio logical channels, the MCU on the sender side does not need to create an audio coder for the terminal on the sender side, but the MCU on the receiver side creates an audio coder and a decoder for the terminal on the receiver side. Moreover, the MCU on the receiver side needs to decode the received audio packets that are transmitted in a cascaded way, replace the packets, and encode the packets again to accomplish compatibility between terminals.

Therefore, regardless of the number of MCUs cascaded, the audio packets do not need to undergo any coding or decoding operation while the audio packets are transmitted between the MCUs except the MCU on the receiver side. Therefore, the whole audio processing process of cascaded transmission involves only two operations of coding and decoding. That is, the MCU on the sender side transmits the audio data between multiple MCUs through multiple audio logical channels. When the data is transmitted to the MCU on the receiver side, because the MCU on the receiver side does not support multiple audio logical channels, the MCU on the receiver side needs to decode the audio data of the multiple audio logical channels, and substitute the audio data of a greater volume from the terminal of the MCU on the receiver side for the audio data of a smaller volume in the audio data of the multiple audio channels. The MCU on the receiver side encodes the substituted multiple channels of audio data again, and sends the data to the terminal of the MCU on the receiver side. The terminal of the MCU on the receiver side receives the audio packet and decodes it.

Figure 11:
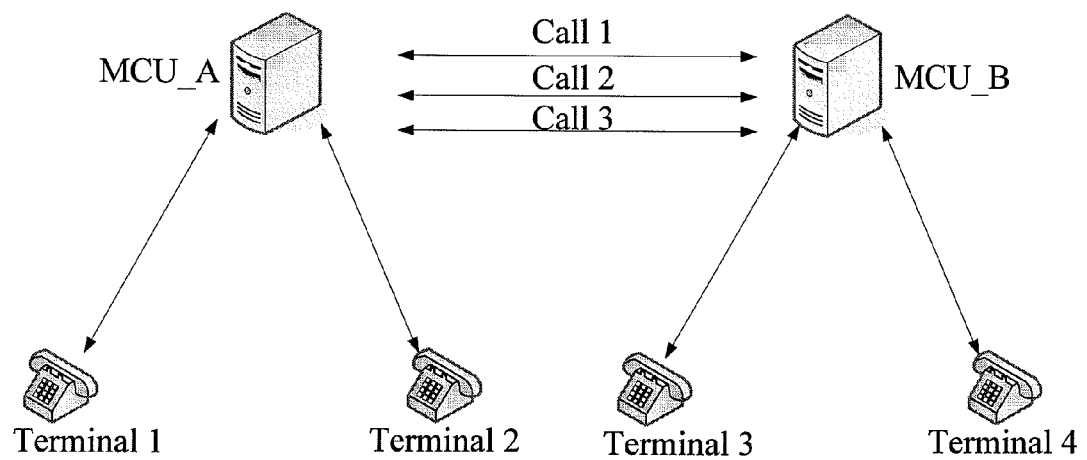
FIG. 11 shows the architecture of an audio processing method in the sixth embodiment of the present disclosure.
Figure 12:
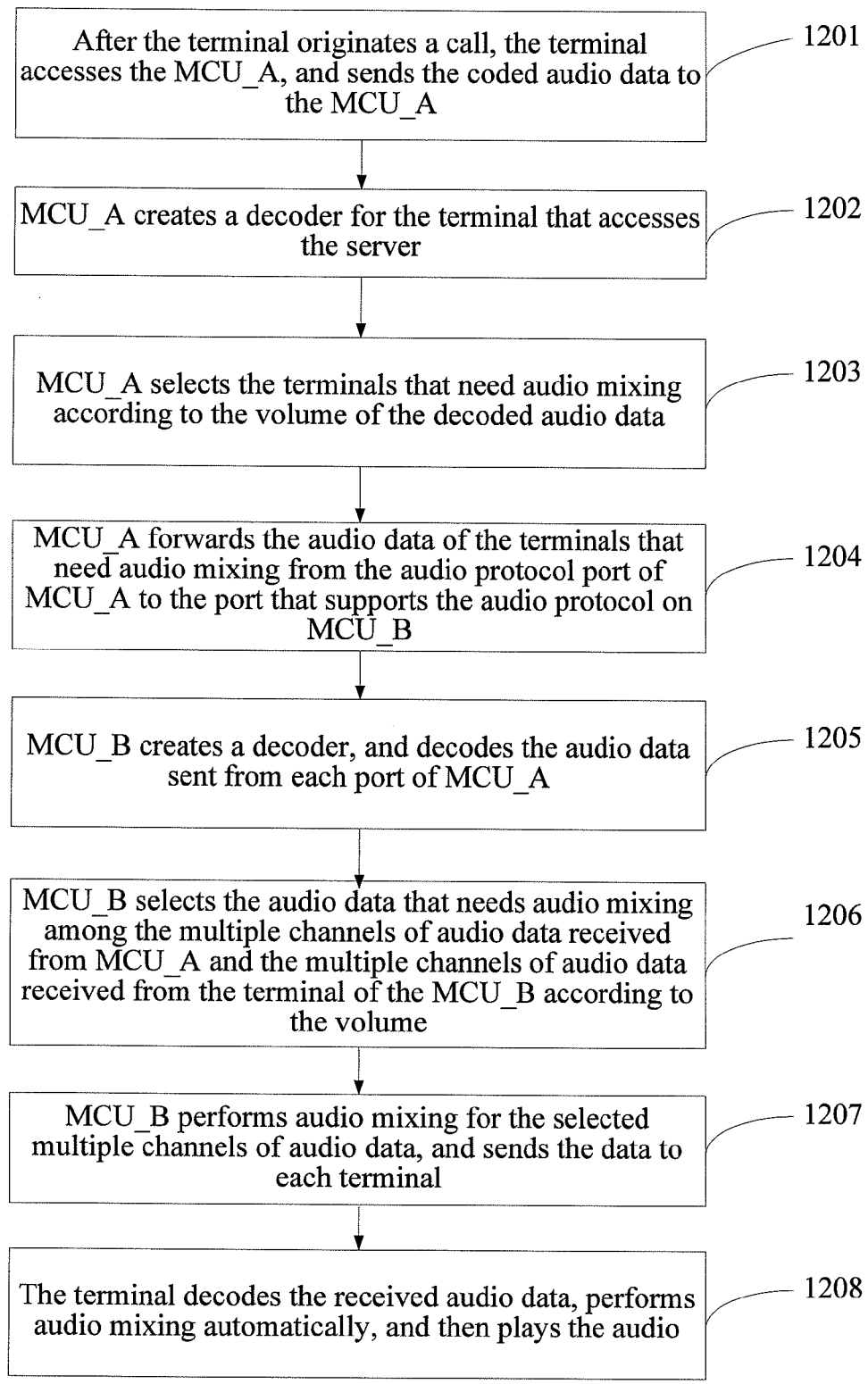
FIG. 12 is a flowchart of an audio processing method in the sixth embodiment of the present disclosure.

FIG. 11 shows architecture of an audio processing method in the sixth embodiment of the present disclosure. In FIG. 11, the control server is MCU, terminal 1 and terminal 2 are connected with MCU_A, terminal 3 and terminal 4 are connected with MCU_B, and the terminals implement multi-point audio processing through connection with the MCU. Meanwhile, multiple channels of cascaded calls are implemented between MCU_A and MCU_B. That is, multiple channels of calls are set up dynamically between cascaded MCU_A and MCU_B according to the number of terminals that need audio mixing. Each channel of call has only one audio channel. The protocol between the audio channels may differ. In FIG. 11, three channels of cascaded calls (indicated by the bidirectional solid line arrow in FIG. 11) are set up between MCU_A and MCU_B, and one channel of call is set up between each terminal and the MCU. In light of the architecture shown in FIG. 11, the audio processing method in the sixth embodiment of the present disclosure is shown in FIG. 12. This embodiment deals with audio data processing between MCUs through concatenation of multiple channels of calls.

Step 1201: After the terminal originates a call, the terminal accesses MCU_A, and sends the coded audio data to MCU_A.

Step 1202: MCU_A creates a decoder for the terminal that accesses the server.

Step 1203: MCU_A selects the terminals that need audio mixing according to the volume of the decoded audio data.

Step 1204: MCU_A forwards the audio data of the terminals that need audio mixing from the audio protocol port of MCU_A to the port that supports the audio protocol on MCU_B.

Step 1205: MCU_B creates a decoder, and decodes the audio data sent from each port of MCU_A.

Step 1206: MCU_B selects the audio data that needs audio mixing among the multiple channels of audio data received from MCU_A and the multiple channels of audio data received from the terminal of the MCU_B according to the volume.

Step 1207: MCU_B performs audio mixing for the selected multiple channels of audio data, and sends the data to each terminal.

Step 1208: The terminal decodes the received audio data, performs audio mixing automatically, and then plays the audio.

When multiple MCUs are cascaded, the audio call is generally implemented through a pair of MCU ports cascaded. However, in the sixth embodiment of the present disclosure, multiple pairs of ports are used between two cascaded MCUs to support multiple channels of calls based on different audio protocols. In this way, multi-channel audio mixing is performed for multiple channels of audio data.

When a terminal supports the multi-channel separation audio codec protocol or supports multiple audio logical channels, the audio data which is based on different audio protocols and sent by the terminal of the cascaded MCUs may be sent to such a terminal directly. Therefore, regardless of the number of MCUs cascaded, only one audio coding operation and one audio decoding operation are required. For example, in FIG. 11, terminal 1 and terminal 2 support different audio protocols, and terminal 3 supports multiple audio logical channels. Three channels of cascaded calls corresponding to the three terminals are set up between cascaded MCU_A and MCU_B. Therefore, terminal 1 and terminal 2 encode their own audio data, and send the coded data to MCU_A. MCU_A sends the audio data of terminal 1 to MCU_B through cascaded call 1, and sends the audio data of terminal 2 to MCU_B through cascaded call 2. MCU_B encapsulates the two channels of audio data into packets, and sends the packets to terminal 3. Terminal 3 decodes the audio packets.

When the terminals support different types of audio protocols, the MCU on the sender side creates an audio coder for the terminal on the sender side, and the MCU on the receiver side decodes the received multiple channels of audio data transmitted in a cascaded way, performs audio-mixed coding, and sends the data to the terminal on the receiver side for decoding. The MCU on the receiver side creates an audio decoder for the terminal on the receiver side. Therefore, regardless of the number of MCUs cascaded, the audio packets do not need to undergo any coding or decoding operation while the audio packets are transmitted between the MCUs except the MCU on the sender side and the MCU on the receiver side. The audio processing of the whole cascaded transmission needs only two operations of coding and decoding. For example, in FIG. 11, terminal 1, terminal 2, and terminal 3 support different audio protocols. Three channels of cascaded calls corresponding to the three terminals are set up between cascaded MCU_A and MCU_B. Therefore, terminal 1 and terminal 2 encode their own audio data, and send the coded data to MCU_A. MCU_A sends the audio data of terminal 1 to MCU_B through cascaded call 1, and sends the audio data of terminal 2 to MCU_B through cascaded call 2. MCU_B decodes the two channels of received audio data, performs audio mixing, encodes the data into the audio data corresponding to the audio protocol of terminal 3, and sends the coded audio data to terminal 3. After receiving the audio data, terminal 3 decodes the audio data according to the supported audio protocol.

In light of the method embodiment of the present disclosure, when the service operation platform schedules the MCU, a proper MCU concatenation scheme can be selected automatically according to the capability information obtained through capability negotiation with the terminal. For example, for a cascaded conference, if all terminals support the multi-channel separation audio codec protocol, the service operation platform schedules the cascaded conference of the multi-channel separation audio codec protocol automatically; if all terminals support multiple audio logical channels, the service operation platform schedules the cascaded conference of multiple audio logical channels automatically; if some terminals support the multi-channel separation audio codec protocol but other terminals are ordinary terminals, the service operation platform automatically schedules the multi-channel call cascaded conference that involves the terminals of the multi-channel separation audio codec protocol and the terminals of other audio protocols; and, if some terminals support multiple audio logical channels but other terminals are ordinary terminals, the service operation platform schedules the cascaded site that involves all audio protocols automatically. For a single-MCU conference, if all terminals support the multi-channel separation audio codec protocol, the service operation platform schedules the single-MCU conference of the multi-channel separation audio codec protocol automatically; and, if all terminals support multiple audio logical channels, the service operation platform schedules the single-MCU conference of multiple audio logical channels automatically.

Corresponding to the audio processing method disclosed herein, an audio processing system is provided in an embodiment of the present disclosure.

Figure 13:
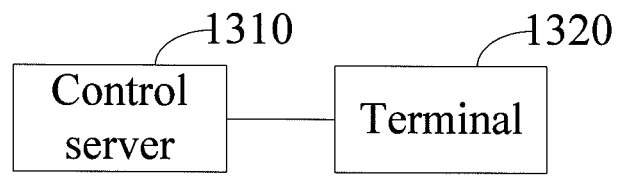
FIG. 13 is a block diagram of an audio processing system in an embodiment of the present disclosure.

FIG. 13 is a block diagram of an audio processing system in an embodiment of the present disclosure.

The system includes at least one control server 1310 and multiple terminals 1320. The control server 1310 is configured to: obtain audio capabilities of the terminal through capability negotiation, and forward the coded audio data to each terminal according to the audio capabilities. The terminal 1320 is configured to: access the control server, decode the received audio data, mix the audio data automatically, and play them. Corresponding to the audio processing method and the audio processing system disclosed herein, a control server is provided in an embodiment of the present disclosure. The control server includes: an obtaining unit 1410, configured to obtain audio capabilities of the terminal through capability negotiation; and a forwarding unit 1420, configured to forward the coded audio data to each terminal according to the audio capabilities.

Figure 14:
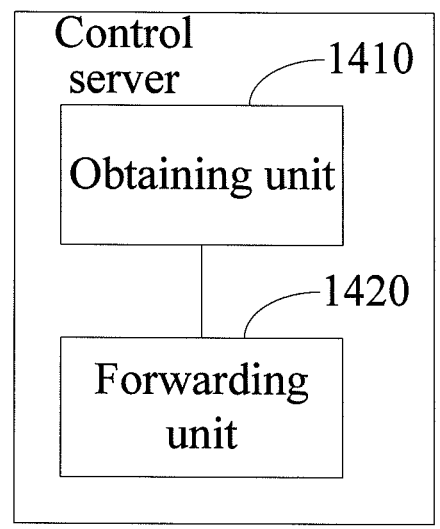
FIG. 14 is a block diagram of a control server in an embodiment of the present disclosure.

Further, if multiple channels of audio data are selected and encapsulated into an audio packet, which is then forwarded in an audio logical channel (namely, the audio capabilities obtained by the obtaining unit 1410 indicate support of multi-channel separation audio codec protocols), the forwarding unit 1420 includes (not illustrated in FIG. 14): a selecting unit, configured to select audio data of several terminals for audio mixing according to the volume of the audio data; a retrieving unit, configured to extract the audio data in the independent channel of the several terminals; and a sending unit, configured to: encapsulate the extracted audio data into a packet, and then send the packet to each terminal through an audio logical channel.

If multiple channels of audio data are selected and encapsulated into an audio packet, which is then forwarded in an audio logical channel (namely, the audio capabilities obtained by the obtaining unit 1410 indicate support of multi-channel separation audio codec protocols), and, if the control server is a sender-side control server among multiple cascaded control servers, the forwarding unit 1420 includes (not illustrated in FIG. 14): a selecting unit, configured to select audio data of several terminals for audio mixing according to the volume of the audio data; a retrieving unit, configured to extract the audio data in the independent channel of the several terminals; and a transmitting unit, configured to: encapsulate the extracted audio data into a packet, and then transmit the packet to the receiver-side control server through an audio logical channel in a cascaded way.

If multiple channels of audio data are selected and encapsulated into an audio packet, which is then forwarded in an audio logical channel, and, if the control server is a receiver-side control server among multiple cascaded control servers, the forwarding unit 1420 includes (not illustrated in FIG. 14): a selecting unit, configured to select receiver-side audio data in place of the audio data sent by the sender-side control server according to the volume; and a sending unit, configured to: encapsulate substituted audio data into a packet, and then send the packet to each terminal through an audio logical channel.

If multiple channels of audio data are forwarded in multiple audio logical channels (namely, the audio capabilities obtained by the obtaining unit 1410 indicate support of multiple audio logical channels), the forwarding unit 1420 includes (not illustrated in FIG. 14): a selecting unit, configured to select audio data of several terminals for audio mixing according to the volume of the audio data; and a sending unit, configured to send the audio data of several terminals to each terminal directly through multiple audio logical channels.

If multiple channels of audio data are forwarded in multiple audio logical channels (namely, the audio capabilities obtained by the obtaining unit 1410 indicate support of multiple audio logical channels), and the control server is a sender-side control server among multiple cascaded control servers, the forwarding unit 1420 includes (not illustrated in FIG. 14): a selecting unit, configured to select audio data of several terminals for audio mixing according to the volume of the audio data; and a transmitting unit, configured to transmit the audio data of the several terminals to the receiver-side control server through multiple audio logical channels in a cascaded way.

If multiple channels of audio data are forwarded in multiple audio logical channels, and the control server is a receiver-side control server among multiple cascaded control servers, the forwarding unit 1420 includes (not illustrated in FIG. 14): a selecting unit, configured to select receiver-side audio data in place of the audio data sent by the sender-side control server according to the volume; and a sending unit, configured to send substituted audio data to each terminal directly through multiple audio logical channels.

If the control server is a sender-side control server among multiple control servers for multiple channels of calls cascaded, the forwarding unit 1420 includes (not illustrated in FIG. 14): a selecting unit, configured to select audio data of several terminals for audio mixing according to the volume of the audio data; and a transmitting unit, configured to transmit the audio data of the several terminals from the audio protocol port corresponding to the terminals to the corresponding port of the receiver-side control server in a cascaded way.

If the control server is a receiver-side control server among multiple control servers for multiple channels of calls cascaded, the forwarding unit 1420 includes (not illustrated in FIG. 14): a selecting unit, configured to select several channels of audio data for audio mixing among the audio data received from the sender-side control server and the audio data of this receiver according to the volume; and a sending unit, configured to perform audio mixing for the several channels of audio data, and send the data to each terminal.

If the terminal that receives the audio data does not support the multi-channel separation audio codec protocol or multiple audio logical channels, the control server may further include a creating unit, configured to create resources for audio mixing and coding for the terminal. In this case, the forwarding unit 1420 includes (not illustrated in FIG. 14): a selecting unit, configured to select audio data of several terminals for audio mixing according to a preset policy; and a transmitting unit, configured to: decode the audio data through the resources, perform audio-mixed coding, and send the data to the terminal.

It is worthy of attention that: In the foregoing embodiments, the control server selects the terminals for audio mixing according to the volume. In practice, the terminals for audio mixing may be selected according to other preset policies, for example, according to the call identifier of the terminal (the terminal of a special identifier is the terminal to be selected), or according to the call order of the terminal (the terminals whose calls occur earlier are the terminals to be selected). In the foregoing embodiments, MCU is as an example of control server, it is easily understood that any devices with the function of the MCU are within the scope of disclosure.

In the embodiments of the present disclosure, the audio data does not need to undergo an operation of audio coding and decoding every time when the audio data passes through a control server, and the coding and decoding operations required to be performed by the control server are reduced drastically. Especially, in the case that only one control server exists, the audio delay between terminals derive from only network transmission, coding of the sending terminal, and decoding of the receiving terminal, and the control server extracts and reassembles the packets of the audio data only. Therefore, the delay is ignorable, the real time of interaction between terminals is enhanced, the control server occupies less audio codec resources, and the costs are reduced. Multiple audio channels are mixed on the basis of reducing the operations of coding and decoding by the control server, and the technical solution under the present disclosure is highly compatible with the control server based on the existing standard protocol and is widely applicable to communication fields such as videoconference and conference calls.

Persons of ordinary skilled in the art should understand that all or part of the steps of the method in the embodiments of the present disclosure may be implemented by a program instructing relevant hardware. The program may be stored in a computer-readable storage medium accessible by a processor in a server. When the program runs, the following steps are performed: After the terminal accesses the control server, the control server obtains the audio capabilities of the terminal through capability negotiation, and the control server forwards the coded audio data to each terminal according to the audio capabilities. The storage medium may be ROM/RAM, magnetic disk, or CD-ROM.

What is claimed is:

1. An audio processing method, comprising:

receiving, by a control server, coded audio data sent by each terminal that accesses the control server;

performing, by the control server, capability negotiation with each terminal to obtain audio capabilities of each terminal; and forwarding, by the control server, audio data extracted from the coded audio data to each terminal according to the audio capabilities in one of the following modes: if all terminals support multi-channel separation audio codec protocols, the control server selects multiple channels of audio data among the audio data to generate encapsulated data, and transmits the encapsulated data to each terminal through an audio logical channel; and if all terminals support multiple audio logical channels, the control server selects multiple channels of audio data among the audio data, and transmits the selected audio data to each terminal through the multiple audio logical channels;

wherein if only one control server exists, the control server forwards the audio data extracted from the coded audio data to each terminal that accesses the control server according to the audio capabilities;

wherein the selecting by the control server of the multiple channels of audio data among the audio data to generate encapsulated data, and transmitting of the encapsulated data to each terminal through the audio logical channel if only one control server exists and a terminal supports the multi-channel separation audio codec protocols comprises:

selecting, by the control server, audio data of a plurality of terminals for audio mixing according to a preset policy;

retrieving, by the control server, audio data in independent channels of the plurality of terminals; and encapsulating, by the control server, the audio data into a packet, and then sending the packet to each terminal through the audio logical channel;

and wherein the selecting by the control server of the multiple channels of audio data among the audio data, and transmitting the selected audio data to each terminal through the multiple audio logical channels if only one control server exists and a terminal supports the multiple audio logical channels comprises:

selecting, by the control server, audio data of a plurality of terminals for audio mixing according to a preset policy; and sending, by the control server, the audio data of the plurality of terminals to each terminal directly through the multiple audio logical channels.

2. The method of claim 1, wherein the generating of encapsulated data comprises:

extracting audio data in different channels, and combining the extracted audio data into an audio packet; or performing separated encapsulation for the audio data in different channels directly.

3. The method according to claim 1, wherein:

the preset policy may be: volume of the audio data, a call identifier of the terminal, or call order of the terminal.

4. The method of claim 1, wherein:

if a terminal does not support the multi-channel separation audio codec protocol or multiple audio logical channels, the method further comprises: creating, by the control server, resources of audio mixing and coding for the terminal; and the forwarding by the control server of the audio data extracted from the coded audio data to each terminal according to the audio capabilities comprises:

selecting, by the control server, audio data of a plurality of terminals for audio mixing according to a preset policy; and decoding the audio data through the resources, performing audio-mixed coding, and then sending the audio data to the terminal.

5. An audio processing method, comprising:

receiving, by a control server, coded audio data sent by each terminal that accesses the control server;

performing, by the control server, capability negotiation with each terminal to obtain audio capabilities of each terminal; and forwarding, by the control server, audio data extracted from the coded audio data to each terminal according to the audio capabilities in one of the following modes: if all terminals support multi-channel separation audio codec protocols, the control server selects multiple channels of audio data among the audio data to generate encapsulated data, and transmits the encapsulated data to each terminal through an audio logical channel; and if all terminals support multiple audio logical channels, the control server selects multiple channels of audio data among the audio data, and transmits the selected audio data to each terminal through the multiple audio logical channels;

wherein if multiple control servers are cascaded, the control servers transmit the data in a cascaded way according to the audio capabilities; a sender-side control server receives the coded audio data sent by each terminal that accesses the sender-side control server, extracts audio data from the coded audio data sent by each terminal and send the audio data to a receiver-side control server, and then the receiver-side control server forwards the extracted audio data to each terminal that accesses the receiver-side control server;

wherein the selecting by the control server of the multiple channels of audio data among the audio data to generate encapsulated data, and transmitting of the encapsulated data to each terminal through the audio logical channel if multiple control servers are cascaded and if a terminal supports the multi-channel separation audio codec protocols comprises:

selecting, by the sender-side control server, audio data of a plurality of terminals for audio mixing according to a preset policy;

retrieving, by the sender-side control server, audio data in independent channels of the plurality of terminals;

encapsulating, by the sender-side control server, the audio data into a packet, and transmitting the packet to the receiver-side control server in the cascaded way;

selecting, by the receiver-side control server, receiver-side audio data in place of the audio data sent by the sender-side control server according to the preset policy; and encapsulating the receiver-side audio data into a packet, and sending the packet to each terminal through the audio logical channel;

and wherein the selecting by the control server of the multiple channels of audio data among the audio data, and transmitting the selected audio data to each terminal through the multiple audio logical channels if multiple control servers are cascaded and a terminal supports the multiple audio logical channels comprises:

selecting, by the sender-side control server, audio data of a plurality of terminals for audio mixing according to a preset policy;

transmitting the audio data of the plurality of channels to the receiver-side control server in the cascaded way;

selecting, by the receiver-side control server, receiver-side audio data in place of the audio data sent by the sender-side control server according to the preset policy; and sending the receiver-side audio data to each terminal directly through the multiple audio logical channels.

6. The method of claim 5, wherein multiple channels of calls exist between multiple cascaded control servers, and the forwarding by the control server of the audio data extracted from the coded audio data to each terminal according to the audio capabilities comprises:

selecting, by the sender-side control server, audio data of a plurality of terminals for audio mixing according to a preset policy;

transmitting the audio data of the plurality of terminals from an audio protocol port corresponding to the terminals to a corresponding port of the receiver-side control server in the cascaded way;

selecting, by the receiver-side control server, a plurality of channels of audio data for audio mixing among the received audio data and audio data of this receiver according to the preset policy; and performing audio mixing for the plurality of channels of the audio data, and sending the data to each terminal.

7. The method according to claim 5, wherein:

the preset policy may be: volume of the audio data, a call identifier of the terminal, or call order of the terminal.

8. A control server, comprising:

an obtaining unit, configured to receive coded audio data sent by each terminal that accesses the control server, and perform capability negotiation with each terminal to obtain audio capabilities of each terminal; and a forwarding unit, configured to forward audio data extracted from the coded audio data without decoding the coded audio data to each terminal according to the audio capabilities;

wherein if the audio capabilities obtained by the obtaining unit indicate support of multi-channel separation audio codec protocols, the forwarding unit comprises:

a selecting unit, configured to select audio data of several terminals for audio mixing according to a preset policy;

a retrieving unit, configured to extract audio data in independent channels of the several terminals; and a sending unit, configured to encapsulate the extracted audio data into a packet, and then send the packet to each terminal or cascaded ports through an audio logical channel.

9. A control server, comprising:

an obtaining unit, configured to receive coded audio data sent by each terminal that accesses the control server, and perform capability negotiation with each terminal to obtain audio capabilities of each terminal; and a forwarding unit, configured to forward audio data extracted from the coded audio data without decoding the coded audio data to each terminal according to the audio capabilities;

wherein if the audio capabilities obtained by the obtaining unit indicate support of multi-channel separation audio codec protocols and the control server is a sender-side control server among multiple cascaded control servers, the forwarding unit comprises:

a selecting unit, configured to select audio data of several terminals for audio mixing according to a preset policy;

a retrieving unit, configured to extract audio data in independent channels of the several terminals; and a transmitting unit, configured to encapsulate the extracted audio data into a packet, and then transmit the packet to a receiver-side control server through an audio logical channel in a cascaded way.

10. A control server, comprising:

an obtaining unit, configured to receive coded audio data sent by each terminal that accesses the control server, and perform capability negotiation with each terminal to obtain audio capabilities of each terminal; and a forwarding unit, configured to forward audio data extracted from the coded audio data without decoding the coded audio data to each terminal according to the audio capabilities;

wherein if the audio capabilities obtained by the obtaining unit indicate support of multiple audio logical channels and the control server is a sender-side control server among multiple cascaded control servers, the forwarding unit comprises:

a selecting unit, configured to select audio data of several terminals for audio mixing according to a preset policy; and a transmitting unit, configured to transmit the audio data of the several terminals to a receiver-side control server through the multiple audio logical channels in a cascaded way.

* * * * *